United States Patent [19]

Rinker

[11] Patent Number: 4,527,847
[45] Date of Patent: Jul. 9, 1985

[54] MOUNTING ASSEMBLY FOR ROTATABLE ELECTRICAL CONNECTOR

[75] Inventor: Larry C. Rinker, Reading, Pa.

[73] Assignee: Burroughs Corp., Detroit, Mich.

[21] Appl. No.: 614,568

[22] Filed: May 29, 1984

[51] Int. Cl.³ ............................................. H01R 35/00
[52] U.S. Cl. .................................... 339/5 R; 174/86; 339/138; 339/195 A
[58] Field of Search ............. 339/1 R, 2 R, 2 A, 2 L, 339/5 R, 5 A, 5 M, 6 R, 8 R, 8 P, 8 PB, 8 PS, 31 R, 64 R, 64 M, 68, 88 R, 88 C, 89 R, 89 M, 89 C, 136 M, 138, 140 R, 140 C, 191 A, 195 A, 196 A, DIG. 2, 143 R; 174/86

[56] References Cited

U.S. PATENT DOCUMENTS 1,817,004 8/1931 Hubbell, Jr. ........................ 339/2 L
2,654,869 10/1953 Mudd, Jr. ............................ 339/8 P

*Primary Examiner*—Neil Abrams
*Attorney, Agent, or Firm*—Francis A. Varallo; Mervyn L. Young; Kevin R. Peterson

[57] ABSTRACT

The mounting assembly of the present disclosure finds particular application in shielded electrical cable having connectors at opposite extremities thereof and carrying electrical conductors between spaced-apart equipments having respective mating connectors. In accordance with the disclosure, a mounting assembly is provided which may be disposed at either extremity of the cable, or at both extremities, and which permits the cable connectors to rotate through a prescribed arc about the cable axis. This rotation compensates for the torsional inflexibility of the cable, thereby facilitating the orientation of the mating connectors required for attachment, and electrically linking the equipments.

7 Claims, 3 Drawing Figures

MOUNTING ASSEMBLY FOR ROTATABLE ELECTRICAL CONNECTOR

BACKGROUND OF THE INVENTION

The operation of electrical and electronic systems such as those of the data processing field, often require the interconnection of spaced-apart, though relatively proximate, equipments housed in respective cabinets. In order to provide EMI/RFI protection, and to meet the recently imposed FCC emission control requirements, the electrical conductors carrying signal information must be enclosed within a conduit formed for example of at least one layer of a tinned braid of copper clad steel wire. A neoprene rubber jacket, or the like, may be placed over the latter for insulation and abrasion resistance. The cable, thus formed, exhibits flexibility in bending along its longitudinal axis, but extreme torsional rigidity. Connector mounting assemblies are permanently affixed to opposite extremities of the cable. The connectors themselves generally engage threaded nuts which form part of the assemblies and thus become integral rigid parts thereof. The electrical conductors within the conduit are electrically connected to contact elements within the connectors.

The foregoing rigid design may result in significant operational problems. Consider the necessity of electrically linking two equipments, spaced for example, a few feet apart. Each of the equipments includes a connector adapted to mate with a cable connector. The attachment of the cable and equipment connectors to each other requires the precise orientation thereof in order to insure electrical continuity for the signals being transmitted therethrough. Thus, with one end of the cable free, that is, unattached, the cable and a first connector at the other end, may be rotated as a unit about their longitudinal axes in order to achieve such orientation with the connector on a first piece of equipment, and attachment is readily accomplished. However, the joining of the second cable connector to the second piece of equipment presents a problem. Since the cable exhibits extreme torsional rigidity, any attempt to rotate the last mentioned cable connector to achieve such orientation, often results in either complete disconnection of the first cable connector, or a partial disconnection in which the contact elements or pins of the mating connectors become misaligned. This condition results in intermittent contact. The same operational problems may also occur if one of the two equipments linked by a cable of rigid design is physically moved relative to the other.

What is required is a connector mounting assembly which will compensate for the torsional inflexibility of the cable conduit and allow the cable connector attached thereto to be rotated through a prescribed arc independently of the cable, so as to achieve the requirement attachment orientation. The mounting assembly of the present invention fills such a need, and may be directly substituted for the aforementioned rigid assembly.

SUMMARY OF THE INVENTION

In accordance with the present invention, there is provided a connector mounting assembly for cable which comprises a unique ferrule and threaded nut combination. The ferrule which is permanently attached to an extremity of the shielded cable conduit is in the form of an eyelet. That is, the ferrule has a unitary cylindrical body section in which the cable conduit extremity is disposed and an outer circular flange. A threaded nut is positioned over the cable and ferrule, and is held captive by the flange of the latter. A connector having a threaded body section is adapted to engage the threaded portion of the nut and to be drawn tightly thereagainst, such that the connector and mounting nut become an integral unit.

In the absence of the present invention, the foregoing construction results in a rigid design wherein the connector and mounting assembly are fixed to the cable conduit and are incapable of rotation about the cable axis. The connector rotation feature of the present invention is implemented by providing a counterbore of predetermined depth in the face of the threaded nut such that the ferrule flange is accommodated thereby and is recessed therein. Further, the cylindrical body portion of the ferrule is provided with an external rib. The latter is designed to contact one or more protrusions on the inside of the threaded nut when the latter is disposed thereover.

In fabricating the cable, the nut is placed over the cable with its threaded portion oriented toward the proximal cable extremity. The ferrule is then attached to the braided conduit by soldering or the like. The threaded nut, with the ferrule inside, is threaded into a connector until the nut stops against a washer or "O" ring disposed within the connector for sealing purposes. The connector and nut are now firmly attached to each other. The placement of the ferrule flange within the nut counterbore permits the nut and connector to rotate as a unit through a predetermined arc controlled by the external rib on the ferrule and the internal protrusions of the nut. If the protrusions are arranged opposite each other, it is apparent that an arc of 180° may be traversed. The rotation of the connector about the longitudinal axis of the cable facilitates its attachment to its mating connector on the equipment to be electrically interconnected.

If a neoprene rubber cover or the like is desired over the conduit, it is extended over the ferrule to a point just short of the rib projection, and contacts a shoulder within the threaded nut to form a tight, waterproof seal.

Considering a cable for connecting two spaced-apart pieces of equipment, the connector mounting assembly of the present invention may be used on one cable extremity, although for maximum versatility and convenience, it may be used at both ends of the cable. The number and spatial orientation of the protrusions or stops inside the threaded nut will be dictated by the particular application and the desired arc through which the connector must be rotated. Thus, the use of one protrusion will allow substantially a maximum 360° rotation, while two protrusions may be oriented with respect to each other, to provide any desired arc less than the maximum.

Other features and advantages of the present invention will become apparent in the detailed description of the invention which follows.

DESCRIPTION OF THE PREFERRED EMBODIMENT

Figure 1:
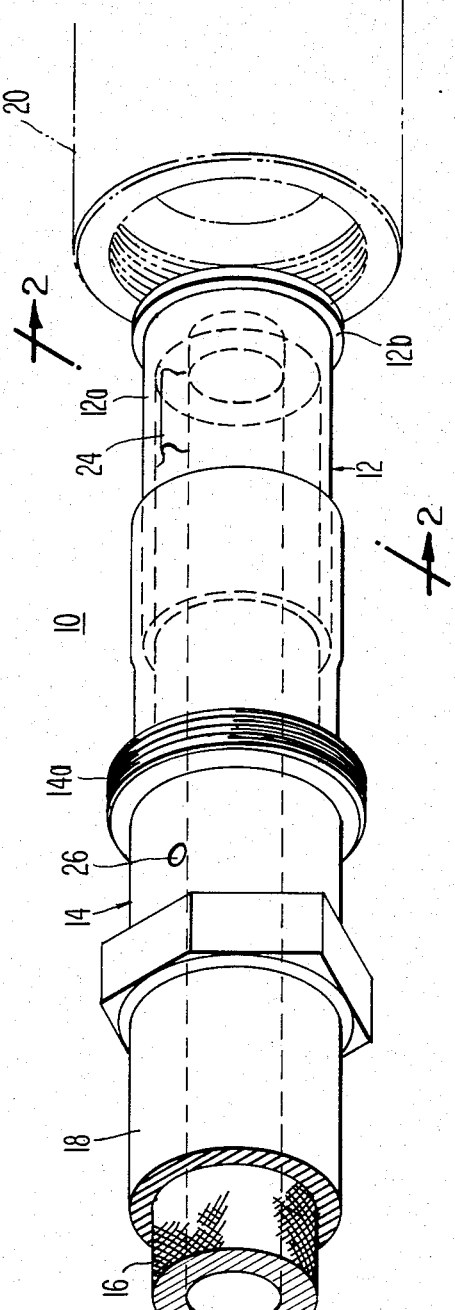
FIG. 1 is a pictorial view of the mounting assembly of the present invention disposed on a shielded cable conduit and shown prior to its attachment to an electrical connector.

FIG. 1 is a pictorial illustration of the mounting assembly 10 of the present invention as utilized in an actual operative embodiment. It should be emphasized that the cable structure depicted and the materials of which the cable conduit and the mounting assembly components are formed, as noted herein, have been presented solely for purposes of example and the invention should not be construed as limited thereto.

The mounting assembly 10 is comprised of two parts, namely, a brass ferrule 12 and a threaded mounting nut 14. The ferrule 12 is a unitary member having an eyelet configuration including a cylindrical body 12a and a circular flange 12b contiguous therewith. The ferrule body 12a is placed over the extremity of a cable conduit 16. The latter may be comprised for example, of braided copper wire or tinned copper clad steel wire. The ferrule body 12a is soldered or otherwise suitably affixed to the conduit 16. As also seen in FIG. 1, the conduit 16 is enclosed in a jacket 18 which may be of neoprene rubber and which electrically insulates and protects the braided conduit 16 from abrasion. The mounting nut 14 is shown drawn back over the jacket 18 and away from the ferrule 12, as it might appear during installation of the mounting assembly 10 on the cable conduit 16. An electrical connector 20 shown in phantom, has internal threads adapted to engage the threaded portion 14a of the mounting nut 14 in a complete cable assembly.

Figure 2:
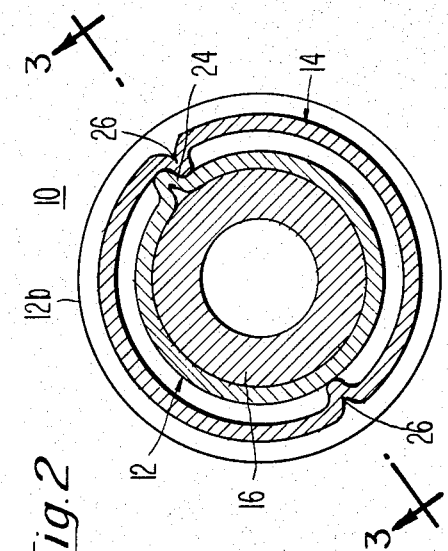
FIG. 2 is a section view taken along the lines 2—2 of FIG. 1 and depicting in detail the connector rotational structures embodied in the mounting assembly.
Figure 3:
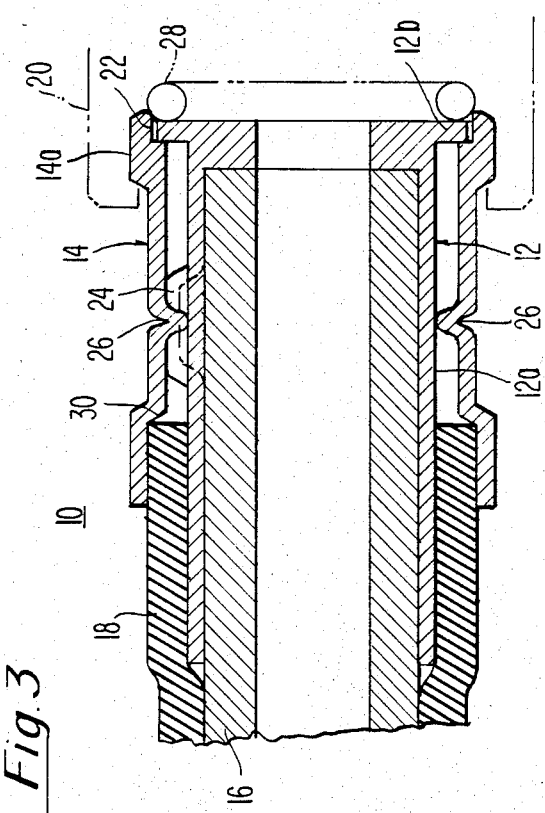
FIG. 3 is a section view taken along the lines 3—3 of FIG. 2 and illustrating particularly the relationship of the assembled portions of the mounting assembly to each other and to the connector.

With continued general reference to FIG. 1 and more specific reference to FIGS. 2 and 3, the unique connector rotational feature of the mounting assembly 10 will be examined. In the latter figures, it is observed that the mounting nut 14 has been drawn up over ferrule 12 in a position to engage the connector 20. The rotational feature of the present invention is implemented as seen in FIG. 3 by providing a counterbore 22 of predetermined depth in the face of threaded nut 14 such that the ferrule flange 12b is accommodated thereby in a recessed state. Further, the ferrule body 12a includes an external rib-like projection 24. The conduit jacket 18 covers a portion of ferrule 12 but allows projection 24 to be exposed. The mounting nut 14, on the other hand, includes a pair of internal protrusions 26, as seen particularly in FIGS. 2 and 3. As will be explained in greater detail hereinafter, the protrusions 26 are designed to contact the stop provided by the ferrule rib-like projection 24.

In fabricating the cable, the nut 14 is placed over the cable conduit 16 with its threaded portion 14a oriented toward the cable extremity which will receive the electrical connector 20. The ferrule 12 is then attached to the braided conduit 16. Insulated electrical wires, not shown, may then be inserted into the conduit 16 for subsequent connection to the connector contact elements, also not depicted in the drawing. The threaded nut 14 with the ferrule 12 disposed inside, as seen in FIG. 3, is threaded into the connector 20 until the nut stops against the "O" ring 28 placed within the connector for weather-sealing purposes. In connection with the latter, the neoprene jacket 18 abuts a shoulder 30 formed within the nut 14 to form a seal. The connector 20 and nut 14 are firmly screwed together to form an integral member.

Since the ferrule flange 12b lies recessed in the nut counterbore 22, the nut 14 and connector 20 are free to rotate as a unit through an arc prescribed by the positions of the nut protrusions 26 and ferrule rib-like projection 24. As seen in FIG. 2, the nut 14 and the connector 20 attached thereto, may rotate approximately 180° about the longitudinal axis of the cable 16. It is apparent that the positions of the nut protrusions 26 relative to each other, control the degree of rotation of the connector 20. On the other hand, if one of the protrusions 26 had been omitted, a rotational capability approaching 360° would have been possible.

Various methods of providing the rib-like projection 24 in ferrule 12 will suggest themselves to the mechanical designer. For example, a tooling mandrel of desired configuration may be inserted within the ferrule body 12a and pressed to make an impression in the latter. On the other hand, a hole may be drilled into the ferrule body 12a and a rib-shaped rivet inserted therein. Still another construction entails the attachment of a separate collar having the required rib structure over the ferrule body 12a. Similarly the internal protrusions 26 in the nut 14 may be implemented by well-known techniques. One convenient method involves the formation of the depressions in the outer surface of the nut 14 by using a punch type press, after ferrule 12 has been soldered to the conduit 16 and the nut is disposed thereover in preparation for engaging connector 20. On the other hand, if holes are provided in the nut surface before assembly to the cable, rivets may be installed as an alternative to the press operation. In either case, delaying the addition of protrusions 26 until the ferrule 12 has been installed on the conduit, permits the nut to move more freely over the conduit 16 and its jacket 18, thereby facilitating final assembly.

In conclusion, there has been disclosed a connector mounting assembly for cables in which no torque is transmitted by the cable to one extremity thereof when electrical connections are made at the opposite extremity. It should be apparent that depending upon the particular application, changes and modifications of the mounting assembly may be required. Such modifications and changes insofar as they are not departures from the true scope of the invention are intended to be covered by the following claims.

What is claimed is:

1. An assembly for rotably mounting an electrical connector on at least one extremity of a jacketed, shielded cable conduit comprising:
   a ferrule having a cylindrical body member and a circular flange at one extremity thereof, an external rib-like projection emanating from the periphery of said body member, said body member being disposed over said cable conduit and being immovably affixed thereto, said flange being contiguous with the cable conduit extremity,
   a mounting nut having a bore for receiving said body member of said ferrule and a counterbore at one extremity thereof for rotatably accommodating said flange, at least one protrusion emanating from an internal surface of said mounting nut within said bore and situated to contact said rib-like projection of said ferrule, said mounting nut being capable of rotation about said ferrule, the orientation of said protrusion with respect to said rib-like projection limiting said rotation to a prescribed arc, said mounting nut being adapted to engage said electrical connector to form a rotatable integral unit therewith.

2. A mounting assembly as defined in claim 1 wherein the depth of said counterbore in said mounting nut is greater than the thickness of said circular flange of said ferrule, thereby permitting the outer surface of said flange to lie recessed.

3. A mounting assembly as defined in claim 2 characterized in that said rib-like projection is disposed along the longitudinal axis of said body member of said ferrule.

4. A mounting assembly as defined in claim 3 further characterized in that said mounting nut includes a body portion having a plurality of external threads for engaging said electrical connector.

5. A mounting assembly as defined in claim 4 wherein said mounting nut includes a pair of arcuately spaced-apart protrusions for contacting said rib-like projection at predetermined respective rotational limits.

6. A mounting assembly as defined in claim 5 wherein said mounting nut includes within said bore, a circumferential shoulder adapted to abut the extremity of the jacketed portion of said cable conduit for sealing purposes.

7. A mounting assembly as defined in claim 6 wherein said protrusions of said mounting nut result from respective depressions formed in the external surface thereof.

* * * * *